United States Patent
Inoue et al.

(10) Patent No.: US 7,078,441 B2
(45) Date of Patent: Jul. 18, 2006

(54) ORGANIC POROUS MATERIAL, PROCESS FOR MANUFACTURING THE SAME, AND ORGANIC POROUS ION EXCHANGER

(75) Inventors: Hiroshi Inoue, Tokyo (JP); Koji Yamanaka, Tokyo (JP)

(73) Assignee: Organo Corporation, Tokyo (JP)

( * ) Notice: Subject to any disclaimer, the term of this patent is extended or adjusted under 35 U.S.C. 154(b) by 0 days.

(21) Appl. No.: 10/929,523

(22) Filed: Aug. 31, 2004

(65) Prior Publication Data

US 2005/0023212 A1    Feb. 3, 2005

Related U.S. Application Data

(62) Division of application No. 10/307,937, filed on Dec. 3, 2002, now Pat. No. 6,841,580.

(30) Foreign Application Priority Data

Dec. 21, 2001  (JP) .............................. 2001/390011

(51) Int. Cl.
*C08J 9/28* (2006.01)
(52) U.S. Cl. .......................... 521/63; 521/61; 521/64; 521/146; 523/218; 526/75; 526/78; 526/79; 526/89
(58) Field of Classification Search ............... 523/218; 526/75, 78, 79, 89; 521/61.63, 146
See application file for complete search history.

(56) References Cited

U.S. PATENT DOCUMENTS

| 3,945,927 A | 3/1976 | Imai et al. |
| 5,624,875 A | 4/1997 | Nakanishi et al. |
| 6,100,306 A | 8/2000 | Li et al. |
| 6,290,853 B1 | 9/2001 | Allmer et al. |
| 2003/0125398 A1 | 7/2003 | Inoue et al. |
| 2003/0150732 A1 | 8/2003 | Yamanaka et al. |
| 2003/0173282 A1 | 9/2003 | Yamanaka et al. |
| 2003/0189005 A1 | 10/2003 | Inoue et al. |
| 2003/0213695 A1 | 11/2003 | Yamanaka et al. |
| 2004/0087732 A1 | 5/2004 | Inoue at al. |
| 2004/0122117 A1 | 6/2004 | Yamanaka et al. |

FOREIGN PATENT DOCUMENTS

DE            3902535 A1 *   8/1990

(Continued)

OTHER PUBLICATIONS

F. SVEC, et al., Science, "New Designs of Macroporous Polymers and Supports: From Seperation to Biocatalysis", vol. 273, pp. 205-211 (1996).

*Primary Examiner*—Helen L. Pezzuto
(74) *Attorney, Agent, or Firm*—Oblon, Spivak, McClelland, Maier & Neustadt, P.C.

(57) ABSTRACT

An organic porous material having a continuous pore structure, which comprises interconnected macropores and mesopores with a radius of 0.01 to 100 μm in the walls of the macropores, having a total pore volume of 1 to 50 ml/g and having pore distribution curve characteristics wherein the value obtained by dividing the half-width of the pore distribution curve at the main peak by the radius at the main peak is 0.5 or less. The organic porous material is useful as an adsorbent having high physical strength and excelling in adsorption amount and adsorption speed, an ion exchanger excelling in durability against swelling and shrinkage, and a filler for chromatography exhibiting high separation capability.

6 Claims, 4 Drawing Sheets

FOREIGN PATENT DOCUMENTS

| WO | WO 98/03242 | 1/1998 |
|----|-------------|--------|
| WO | WO 00/46281 | 8/2000 |

* cited by examiner

ORGANIC POROUS MATERIAL, PROCESS FOR MANUFACTURING THE SAME, AND ORGANIC POROUS ION EXCHANGER

This application is a divisional of Ser. No. 10/307,937, filed Dec. 3, 2002, now U.S. Pat. No. 6,841,580.

BACKGROUND OF THE INVENTION

1. Field of the Invention

The present invention relates to an organic porous material useful as an adsorbent, a filler for chromatography, and an ion exchanger, a process for manufacturing the organic porous material, and an organic porous ion exchanger.

2. Description of the Background Art

As a porous material having a continuous pore structure comprising interconnected macropores and mesopores in the walls of the macropores, inorganic porous materials formed from silica and the like are known (U.S. Pat. No. 5,624,875). Development of application of these inorganic porous materials as fillers for chromatography has actively been undertaken. However, since these inorganic porous materials are hydrophilic, complicated and expensive procedures such as a hydrophobicizing treatment of the surface and the like are required to use these materials as adsorbents. In addition, when retained in water for a long period of time, the inorganic porous materials release silicate ions produced by hydrolysis of silica in water. Therefore, it is impossible to use the inorganic porous materials as ion exchangers for producing deionized water and high-purity water. On the other hand, if used as fillers for chromatography, the inorganic porous materials have been reported to exhibit remarkably improved performance over conventional particulate fillers. However, since mesopores in the inorganic porous materials have a size of 50 μm at most due to the manufacturing method, there has been a restriction imposed on a process in which a material is processed at a large flow rate under a low pressure. In addition, it is common in the field of chromatography to wash fillers with a strong alkaline aqueous solution such as a 0.5 M sodium hydroxide aqueous solution. However, if the inorganic porous materials are repeatedly washed with such an aqueous solution, silicate and the like are solubilized or eluted due to hydrolysis, resulting in significant weight loss of the filler. It is thus impossible to frequently carry out the washing operation. For the same reason, an alkaline eluant cannot be used in a system using any of the inorganic porous materials as a filler, imposing a limitation to the object of measurement.

As organic porous materials having continuous pores, porous materials possessing a particle aggregation-type structure have been disclosed in F. Svec, Science, 273, 205–211(1996) and other publications. The porous materials obtained by the method described in these publications has a small pore volume and an insufficient mesopore size due to the particle aggregation-type structure. For these reasons, a limitation is imposed on application of the pore materials in a process with a large flow rate under a low pressure. In addition, since conventional organic porous materials and porous ion exchangers, made by introducing ion exchange groups into the conventional organic porous materials, have many internal structural defects, low strength, poor durability against swelling and shrinkage, and a broad pore distribution, these organic porous materials exhibit only insufficient separating performance when used as a filler for chromatography.

Therefore, development of organic porous materials having a large pore volume and high physical strength, containing pores with a large and uniform pore diameter, being free from internal structural defects such as macrovoids, and having a continuous pore structure has been strongly demanded.

The present invention has been achieved to solve the above problems in the conventional technology and has an object of providing an organic porous material useful as an adsorbent having high physical strength and excelling in adsorption capacity and adsorption rate, an ion exchanger excelling in durability against swelling and shrinkage, and a filler for chromatography exhibiting high separation capability, a process of manufacturing the organic porous material, and an organic porous ion exchanger.

SUMMARY OF THE INVENTION

In view of this situation, the inventors of the present invention have conducted extensive studies and, as a result, have found that an organic porous material obtained by polymerizing a water-in-oil type emulsion prepared by mixing materials to be processed, which materials comprise an oil-soluble monomer not containing any ion exchange group, a surfactant, and water by a specific stirring-mixing method has a pore distribution reflecting a uniform pore size and an outstandingly large pore volume, while retaining physical strength and, therefore, is useful as an adsorbent excelling in adsorption capacity and adsorption rate, an ion exchanger permitting processing at a large flow rate under low pressure and excelling in durability against swelling and shrinkage, and a filler for chromatography exhibiting high separation capability. This finding has led to the completion of the present invention.

Specifically, a first object of the present invention is to provide an organic porous material having a continuous pore structure, which comprises interconnected macropores and mesopores with a radius of 0.01 to 100 μm existing on the walls of the macropores, having a total pore volume of 1 to 50 ml/g and having pore distribution curve characteristics wherein the value obtained by dividing the half-width of the pore distribution curve at the main peak by the radius at the main peak is 0.5 or less (hereinafter referred to as "invention (1)"). The organic porous material has a specific continuous pore structure that is a novel structure quite different from the structure possessed by conventional particle-aggregation type porous materials. In addition, it is possible to remarkably enlarge the pore volume of the organic porous material while retaining its physical strength. Further more, the organic porous material has a sharp pore size distribution curve and is useful as an adsorbent excelling in adsorption capacity and adsorption rate, an ion exchanger permitting processing at a large flow rate under low pressure and excelling in durability against swelling and shrinkage, and a filler for chromatography exhibiting high separation capability.

Another object of the present invention is to provide a process of manufacturing the organic porous material comprising transferring materials to be processed, which materials comprise an oil-soluble monomer not containing any ion exchange group, a surfactant, and water, to a mixing vessel, holding the mixing vessel inclined and causing it to move around a revolution axis while self-rotating, thereby preparing a water-in-oil type emulsion, polymerizing the water-in-oil type emulsion, removing unreacted materials, and drying the resulting product (hereinafter referred to as "invention (2)"). The process permits simple and stable manufacturing of the above-mentioned organic porous material.

A still another object of the present invention is to provide an organic porous ion exchanger having a continuous pore structure, which comprises interconnected macropores and mesopores with a radius of 0.01 to 100 tun existing on the walls of the macropores, having a total pore volume of 1 to 50 ml/g, having pore distribution curve characteristics wherein the value obtained by dividing the half-width of the pore distribution curve at the main peak by the radius at the main peak is 0.5 or less, and having ion exchange groups (hereinafter referred to as "invention (3)"). The organic porous ion exchanger can be used to constitute a desalting chamber for an electrodeionization water production unit by filling it in a space between ion exchange membranes. The resulting electrodeionization water production unit exhibits excellent durability against swelling and shrinkage and can process a large volume of water under a low pressure. In addition, the organic porous ion exchanger is also suitable as a filler for chromatography with superior separation capability.

DETAILED DESCRIPTION OF THE INVENTION AND PREFERRED EMBODIMENTS

Figure 1:
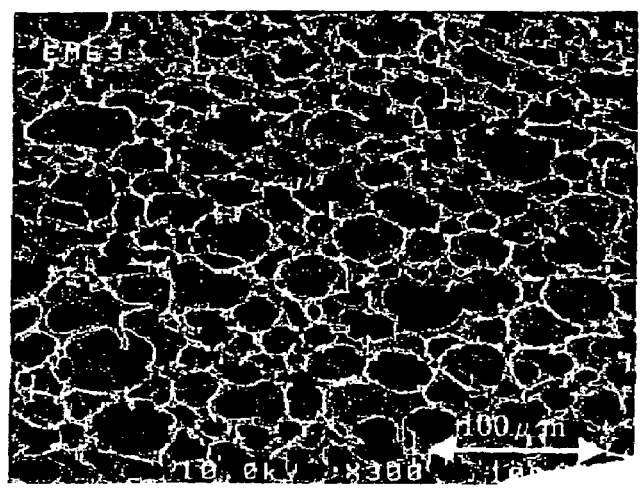
FIG. 1 is an SEM photograph of the organic porous material obtained in Example 1.

The basic structure of the organic porous material and organic porous ion exchanger of the present invention is a continuous pore structure comprising interconnected macropores and mesopores existing on the walls of the macropores, the mesopores having a radius of 0.01 to 100 µm, preferably 0.1 to 100 µm, and particularly preferably 5 to 60 µm. Specifically, the continuous pores usually have a structure in which macropores with a radius of 0.2 to 500 µm are layered. The layered section has mesopores functioning as common openings of macropores, providing an open pore structure. In the open pore structure, pores formed from the macropores and mesopores become flowing paths when a liquid or gas is caused to flow. Layered macropores usually have 1 to 12 layered sections per one macropore, and many of the layered macropores have 3 to 10 layered sections per one macropore. Mesopores with a radius less than 0.01 µm are undesirable because mesopores with a small radius unduly increase the pressure loss during permeation of a liquid or gas. On the other hand, a radius of mesopores exceeding 100 µm is undesirable because contact between a liquid or gas and the organic porous material or organic porous ion exchanger becomes insufficient, loading to inferior adsorption characteristics and ion exchange characteristics. The above-described continuous pore structure of the organic porous material and organic porous ion exchanger ensures uniform formation of macropore groups and mesopore groups and, at the same time, remarkably increases the pore volume as compared with particle-aggregation type porous ion exchangers described in F. Svec, Science, 273, 205–211 (1996) and the like.

The organic porous material and organic porous ion exchanger of the present invention are further characterized by the pore distribution curve characteristics. Specifically, the value (W/R) obtained by dividing the half-width (W) of the pore distribution curve at the main peak by the radius (R) at the main peak is 0.5 or less. The pore distribution curve here is a differential curve of pore distribution determined by the mercury porosimetry method. For a main peak having a height H from the base line of the pore distribution curve, the half-width of the pore distribution curve at the main peak indicates the width at the height of H/2 from the base line of the pore distribution curve. The smaller the value (W/R), the sharper is the pore distribution. If the value (W/R) is 0.5 or less, macropore groups and mesopore groups forming the continuous pore structure are uniformly present, resulting in a sharp mesopore distribution, which in turn remarkably enhances adsorption performance characteristics and separating characteristics of the organic porous material or organic porous ion exchanger of the present invention. In addition, since such a structure contains no macrovoids which are structural defective sites, the resulting product has increased physical strength and improved durability against swelling and shrinkage. Therefore, the organic porous material and organic porous ion exchanger with the value (W/R) of 0.5 or less exhibit outstanding improvement in the performance and functions over the organic porous material or organic porous ion exchanger with the same composition and structure but having the value (W/R) exceeding 0.5.

In addition, the organic porous material and organic porous ion exchanger have a total pore volume of 1 to 50 ml/g. If the total pore volume is less than 1 ml/g, the amount of liquid or gas permeating through a unit area becomes small, resulting in low processing capacity. The total pore volume more than 50 ml/g is undesirable because the strength of the organic porous material and organic porous ion exchanger is unduly impaired. The total pore volume of the conventional synthetic porous adsorbents and ion exchangers is in the range of 0.1 to 0.9 ml/g at most. In the present invention, materials with a greater total pore volume in the range of 1 to 50 ml/g, preferably 5 to 50 ml/g are made available.

When water is used as a liquid and air is used as a gas to permeate the organic porous material or organic porous ion exchanger with a thickness of 10 mm, the organic porous material and organic porous ion exchanger preferably has liquid permeability and gas permeability, in terms of rate of permeation, in the range of 100 to 100,000 L/min·m²·Mpa and 100 to 50,000 m³/min·m²·Mpa, respectively. If rate of permeation and the total pore volume are in the above range, the organic porous material and organic porous ion exchanger can exhibit excellent performance when used as an adsorbent, ion exchanger, or filler for chromatography, because of a large area in contact with liquids and gases, a smooth flow of liquids and gases, and sufficient mechanical strength. The material for the matrix forming the continuous pores is an organic polymer material having a crosslinking structure. The polymer material preferably contains crosslinking structural units in the amount of 5 to 90 mol % of the total amount of all structural units forming the polymer material. If the amount of the crosslinking structural units is less than 5 mol %, the mechanical strength is insufficient. If the amount is more than 90 mol %, it is difficult to introduce ion exchange groups, resulting in a product with an insufficient ion exchange capacity.

There are no specific limitations to the type of polymer material. Examples include styrene-type polymers such as polystyrene, poly(α-methylstyrene), and poly(vinyl benzyl chloride); polyolefins such as polyethylene and polypropylene; poly(halogenated olefin) such as polyvinyl chloride and polytetrafluoroethylene; nitrile-type polymers such as polyacrylonitrile; (meth)acrylic-type polymers such as poly (methyl methacrylate) and poly(ethyl acrylate); styrene-divinylbenzene copolymer, vinyl benzyl chloride-divinylbenzene copolymer, and the like. The above polymers may be either homopolymers obtained by the polymerization of one type of monomer or copolymers obtained by the polymerization of two or more types of monomers. In addition, a blend of two or more polymers may be used. Among these organic polymers, styrene-divinylbenzene copolymer and vinyl benzyl chloride-divinylbenzene copolymer are preferable in view of ease of introduction of ion exchange groups and high mechanical strength. The continuous pore structure of the organic porous material and organic porous ion exchanger of the present invention can be observed by using an scanning electron microscope (SEM). Pore diameters of macropores and mesopores are also observed by SEM.

When the organic porous material of the present invention is used as an adsorbent, that material is cut into a shape suitable for packing into a cylindrical column or prismatic column and packed into the column. Hydrophobic compounds such as benzene, toluene, phenol, paraffins, and the like are efficiently adsorbed on the adsorbent, if water to be processed containing these hydrophobic compounds is caused to pass through the column. Since the pore volume of conventional synthetic porous adsorbents is 0.9 ml/g at most, the adsorbent of the present invention can have several times or more adsorption capacity as compared with conventional adsorbents.

When the organic porous material of the present invention is used as a filler for chromatography, the organic porous material is cut into a shape suitable for packing into a cylindrical column, prismatic column, capillary column, or the like, and packed into the column. The column exhibits high separation performance while maintaining strength when a fluid to be processed is caused to permeate through the column. Reversed-phase liquid chromatography, normal phase liquid chromatography, and partition chromatography can be given as the chromatography. Introduction of micropores renders the organic porous material to be applicable to gel permeation chromatography. In the same manner, introduction of various ligands renders the organic porous material to be applicable to affinity chromatography which can be used for optical resolution and protein separation.

The organic porous ion exchanger of the present invention comprises the above-mentioned organic porous material added with ion exchange groups. Although there are no specific limitations, the organic porous ion exchanger has an ion exchange capacity per unit weight (g) of dry porous material of 0.1 μg equivalent/g or more, preferably 10 μg equivalent/g or more, and particularly preferably 0.5 mg equivalent/g or more Cationic exchange groups such as a sulfonic acid group, carboxylic acid group, iminodiacetic acid group, phosphoric acid group, and phosphate group; anionic exchange group such as a quaternary ammonium group, tertiary amino group, secondary amino group, primary amino group, polyethylene imine group, tertiary sulfonium group, and phosphonium group; amphoteric ion exchange group such as an amino phosphoric acid group and sulfobetaine; and the like can be given as ion exchange groups to be introduced into the organic porous material.

When the organic porous ion exchanger of the present invention is used as a filler for chromatography, the organic ion exchanger is cut into a shape suitable for packing into a cylindrical column, prismatic column, capillary column, or the like, and packed into the column. The column exhibits high separation performance while maintaining strength when a fluid to be processed is caused to permeate through the column. Ion exchange chromatography can be given as the chromatography. If the organic porous ion exchanger prepared by introducing ion exchange groups into the organic porous material having micropores is used as a filler for chromatography, the chromatography can be used as an aqueous gel permeation chromatography.

One example of the process for manufacturing the organic porous material will now be described. Specifically, the process comprises preparing a water-in-oil type emulsion by mixing an oil-soluble monomer not containing any ion exchange group, a surfactant, water, and as required, a polymerization initiator, and polymerizing the water-in-oil type emulsion.

The oil-soluble monomer not containing any ion exchange group implies a lipophilic monomer that does not contain any ion exchange group such as a carboxylic acid group or sulfonic acid group and has low solubility in water. Specific examples of such a monomer include styrene, α-methylstyrene, vinyl toluene, vinyl benzyl chloride, divinylbenzene, ethylene, propylene, isobutene, butadiene, isoprene, chloroprene, vinyl chloride, vinyl bromide, vinylidene chloride, tetrafluoro ethylene, acrylonitrile, methacrylonitrile, vinyl acetate, methyl acrylate, ethyl acrylate, butyl acrylate, 2-ethylhexyl acrylate, trimethylolpropane triacrylate, butanediol diacrylate, methyl methacrylate, ethyl methacrylate, propyl methacrylate, butyl methacrylate, 2-ethylhexyl methacrylate, cyclohexyl methacrylate, benzyl methacrylate, glycidyl methacrylate, and ethylene glycol dimethacrylate. These monomers may be used either individually or in combination of two or more. However, to obtain necessary mechanical strength in the later step of introducing as many ion exchange groups as possible, it is desirable to select at least one monomer from crosslinking monomers, such as divinylbenzene and ethylene glycol dimethacrylate, as a component of the oil-soluble monomer, and incorporate such a monomer in an amount of 1 to 90 mol %, preferably 3 to 80 mol % of the total amount of oil-soluble monomers.

There are no specific limitations to the types of surfactant inasmuch as a water-in-oil (w/o) type emulsion can be formed when the oil-soluble monomer not containing an ion exchange group and water are mixed. Examples of the surfactants include nonionic surfactants such as sorbitan monooleate, sorbitan monolaurate, sorbitan monopalmitate, sorbitan monostearate, sorbitan trioleate, polyoxyethylene nonylphenyl ether, polyoxyethylene stearyl ether, and polyoxyethylene sorbitan monooleate; anionic surfactants such as potassium oleate, sodium dodecylbenzenesulfonate, and dioctyl sodium sulfosuccinate; cationic surfactants such as distearyl dimethyl ammonium chloride; and ampholytic surfactants such as lauryldimethylbetaine. These surfactants may be used either individually or in combinations of two or more. The w/o-type emulsion means an emulsion having a continuous oil phase in which water droplets are dispersed. Although the amount of the above surfactants to be added significantly varies according to the type of oil-soluble monomers and the size of target emulsion particles (macropores), a specific amount can be selected from the range from about 2% to 70% of the total amount of the oil-soluble monomers and surfactants.

A compound that generates radicals by heat or light is suitably used as the polymerization initiator. The polymerization initiator may be either water-soluble or oil-soluble. Examples include azobisisobutyronitrile, azobiscyclohexanenitrile, azobiscyclohexanecarbonitrile, benzoyl peroxide, potassium persulfate, ammonium persulfate, hydrogen peroxide-iron chloride, sodium persulfate-acidic sodium sulfite, tetramethylthiuram disulfide, and the like. In some reaction systems, polymerization proceeds only by heat or light without the addition of a polymerization initiator. In such a case, the polymerization initiator need not be added.

There are no specific limitations to the method of mixing of the oil-soluble monomer not containing an ion exchange group, surfactant, water, and polymerization initiator to prepare an water-in-oil type emulsion. A method of mixing these components all together, a method of preparing a mixture of oil-soluble components, which include oil-soluble monomers, surf actants, and oil-soluble polymerization initiators, and a solution of aqueous components, which includes water and water-soluble polymerization initiators, and mixing the mixture and solution, and other similar methods can be used. A known precipitant may be added as required.

As a mixing apparatus for forming the emulsion, a planet-type agitator can be used. In this type of agitator, the materials to be processed is filled into a mixing container, which is held inclined and caused to move around a revolution axis while self-rotating, thereby mixing the material. The planet-type agitator is a type of apparatus disclosed in Japanese Patent Application Laid-open No. 6-71110 and Japanese Patent Application Laid-open No. 11-104404, for example. The principle of the apparatus is to cause a mixing vessel itself to rotate while causing it to rotate around a revolution axis, whereby heavier components (components having a greater specific gravity) in the processed materials are shifted to the outside, utilizing centrifugal force and, at the same time, bubbles mixed in the liquid are pushed in the reverse direction, thereby defoaming the material. In addition, since the vessel itself rotates while rotating around a revolution axis, spiral flows (whirling flows) are generated in the processed material in the vessel, whereby stirring action is promoted. Although the apparatus may be operated under atmospheric pressure, operation under reduced pressure is more preferable to completely defoam the material in a short period of time.

The mixing conditions such as rate of revolution, rate of rotation, and stirring time can be arbitrarily determined so that the target particle size and distribution of the emulsion can be attained. The desirable rate of revolution varies according to the size and shape of the vessel, but is usually about 500 to 2,000 revolutions/min. A desirable rate of rotation is about one third ($\frac{1}{3}$) the rate of revolution. Although the stirring time also significantly varies according to the properties of the processed material, as well as shape and size of the vessel, usually a period of time in the range of 0.5 to 30 minutes, and preferably 1 to 20 minutes is set. A vessel having a configuration allowing the processed material to be filled into the vessel so that the ratio of the bottom diameter and the height of the filled material becomes 1:0.5 to 1:5 is preferably used. The mixing ratio by weight of the above oil-soluble components and water-soluble components can be arbitrarily determined from the range of 2:98 to 50:50, and preferably 5:95 to 30:70.

Various polymerization conditions can be selected for polymerizing the obtained water-in-oil type emulsion according to the type of monomers and polymerization initiators. For example, when azobisisobutyronitrile, benzoyl peroxide, potassium persulfate, or the like is used as the polymerization initiator, the emulsion may be polymerized with heating at 30 to 100° C. for 1 to 48 hours in a sealed vessel under an inert gas atmosphere. When hydrogen peroxide-iron chloride, sodium persulfate-acidic sodium sulfite, or the like is used as the polymerization initiator, the emulsion may be polymerized at 0 to 30° C. for 1 to 48 hours in a sealed vessel under an inert gas atmosphere. After the polymerization, the reaction mixture is removed from the reaction vessel and, if necessary, extracted with a solvent such as isopropanol to remove unreacted monomers and surfactants, thereby yielding an organic porous material. In the polymerization reaction, oil components in the water-in-oil type emulsion polymerize to form a matrix and water droplets becomes pore structural parts.

Next, a method of manufacturing the organic porous ion exchanger of the present invention is described. As the method of manufacturing the organic porous ion exchanger, a method of manufacturing an organic porous ion exchanger from components containing ion exchange groups in one step, a method of first manufacturing an organic porous material according to the above method or other methods and then introducing ion exchange groups, and other similar methods may be used without any specific limitation. Of these methods, a method of introducing ion exchange groups after manufacturing an organic porous material is more preferable because the method enables stringent control of the structure of the resulting organic porous ion exchanger.

As a method for introducing ion exchange groups into the organic porous material, known methods such as a polymeric reaction, graft polymerization, and the like can be used without any specific limitations. For example, as methods for introducing a sulfonic acid group, a method of sulfonating an organic porous material with chlorosulfuric acid, concentrated sulfuric acid, and fuming sulfuric acid, if the organic porous material is a styrene-divinylbenzene copolymer or the like; a method of introducing a radical initiation group or chain transfer group to an organic porous material and grafting sodium styrene sulfonate or acrylamide-2-methylpropane sulfonic acid; a method of introducing sulfonic acid group by functional group conversion after graft polymerization of glycidyl methacrylate with an organic porous material; and the like can be given. As a method of introducing a quaternary ammonium group when the organic porous material is a styrene-divinyl benzene copolymer or the like, a method of introducing a chloromethyl group using chloromethyl methyl ether or the like and reacting the resulting product with a tertiary amine; a method of preparing an organic porous material by the copolymerization of chloromethyl styrene and divinylbenzene, and then reacting the copolymer with a tertiary amine; a method of introducing a radical initiation group or chain transfer group to an organic porous material and grafting N,N,N-trimethylammonium ethyl acrylate or N,N,N-trimethyl ammonium propyl acrylamide; a method of introducing the quaternary ammonium group by functional group conversion after graft polymerization of glycidyl methacrylate with an organic porous material; and the like can be given. As a method of introducing a betaine, a method of introducing a tertiary amine to the organic porous material by the method described above and then reacting the resulting product with mono-iodoacetic acid and the like can be given. As ion exchange groups to be introduced, cationic exchange groups such as a carboxylic acid group, iminodiacetic acid group, sulfonic acid group, phosphoric acid group, and phosphate group; anionic exchange groups such as a quaternary ammonium group, tertiary amino group, secondary amino group, primary amino group, polyethylene imine group, tertiary sulfonium group, and phosphonium group; ampholytic ion exchange groups such as an amino phosphoric acid group, betaine, and sulfobetaine; and the like can be given.

EXAMPLES

The present invention will be described in more detail by examples, which should not be construed as limiting the present invention.

Example 1

(Preparation of Organic Porous Material)

Styrene (19.24 g), divinylbenzene (1.01 g), sorbitan monooleate (2.25 g), and azobisisobutyronitrile (0.05 g) were mixed and homogeneously dissolved. The resultant mixture of styrene, divinylbenzene, sorbitan monooleate, and azobisisobutyronitrile was added to deionized water (180 g). A water-in-oil type emulsion was obtained by processing the mixture using a planet-type agitator (Vacuum agitation defoaming mixer, manufactured by EME Co., Ltd.) under the following conditions of pressure: 13.3 kPa, ratio of bottom diameter to filling height: 1:1, revolution (rotation around a revolution axis): 1,800 rpm, rotation: 600 rpm/min, and process time: 2.5 minutes. After the emulsification, the reaction system was sufficiently replaced with nitrogen and sealed, and the emulsion was allowed to stand still to polymerize at 60° C. for 24 hours. After the polymerization, the reaction mixture was removed, extracted with isopropanol for 18 hours using a Soxhlet extractor to remove unreacted monomers, water, and sorbitan monooleate, and dried overnight at 85° C. under reduced pressure.

Figure 2:
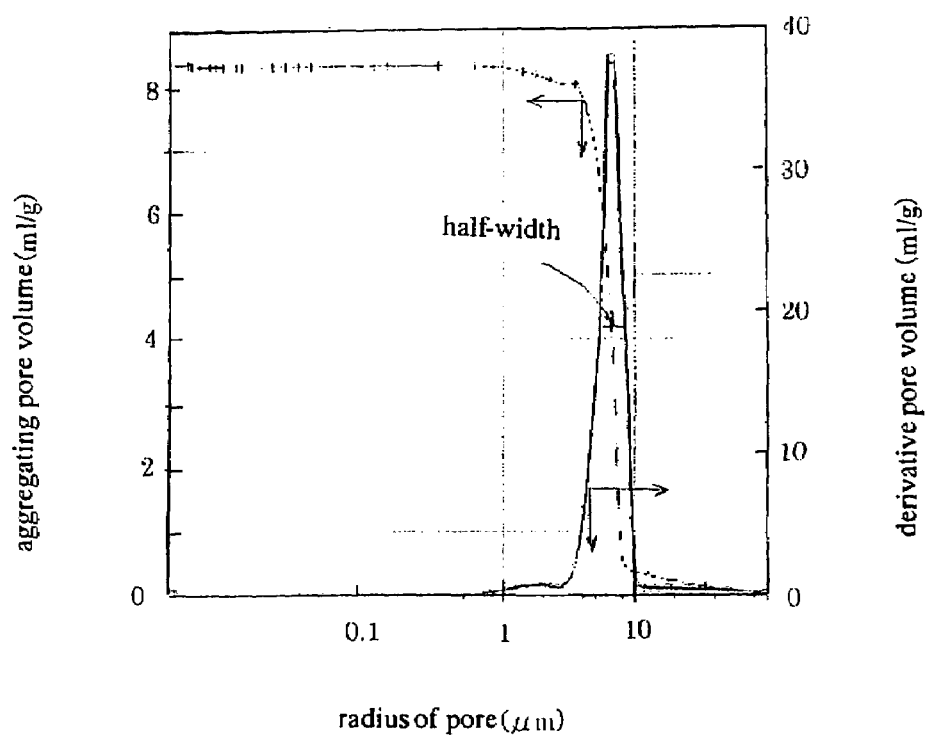
FIG. 2 is a pore distribution curve of the organic porous material obtained in Example 1.

The inner structure of the organic porous material of the styrene/divinylbenzene copolymer containing 3 mol % of a crosslinking component was inspected by SEM. The results are shown in FIG. 1. As is clear from FIG. 1, the organic porous material has a continuous porous structure and contains macropores and mesopores, respectively having a uniform size. The pore distribution curve of the organic porous material measured by the mercury porosimetry method is shown in FIG. 2. As can be seen in FIG. 2, the pore distribution curve was sharp. The radius (R) of a peak was 6.6 µm, the half-width (W) of the peak was 2.8 µm, and the value (W/R) obtained by dividing the half-width by the radius of the peak was 0.42. The total pore volume of the organic porous material was 8.4 ml/g. To confirm the presence or absence of macrovoids, the organic porous material was cut and the inner conditions were observed by the naked eye. There were no macrovoids observed at all.

A cube (2 cm×2 cm×2 cm) was cut from the organic porous material to measure the compression strength at a compression rate of 1 mm/minute at 25° C. The yield stress was 0.92 Mpa. The cube did not collapse until the end of the test. The measurement equipment used was Tensiron UTM-2.5TPL, in which a 500 kg-f load cell was used.

To test the swelling/shrinkage durability of the organic porous material, the organic porous material was caused to swell by dipping it in dichloroethane for 30 minutes, then caused to shrink by drying in air to remove the dichloroethane. This swelling/shrinkage cycle was repeated 3 times. As a result, no cracks were found.

Examples 2 to 4

(Preparation of Organic Porous Material)

organic porous materials were prepared in the same manner as in Example 1, except that the amounts of styrene, divinylbenzene, sorbitan monooleate, and azobisisobutyronitrile were changed as shown in Table 1. The results are shown in Tables 1 and 2. None of the organic porous materials did not have any macrovoids, and all of the organic porous materials exhibited the same sharp mesopores distribution as in Example 1, and exhibited high yield stress. No samples fractured in the compression strength test. In addition, no cracks were found in the swelling/shrinkage test carried out in the same manner as in Example 1.

Comparative Example 1

(Preparation of Organic Porous Material)

An organic porous material was prepared in the same manner as in Example 1, except that instead of the vacuum agitation defoaming mixer a conventional emulsification-dispersion apparatus (Clearmix, manufactured by Organo Corp.) was used as an agitator for preparing an emulsion, the mixture was stirred at 20,000 rpm for two minutes, and the amount of the monomers, emulsifying agent, and water used was 2.5 times the amount used in Example 1. The results are shown in Tables 1 and 2.

Figure 3:
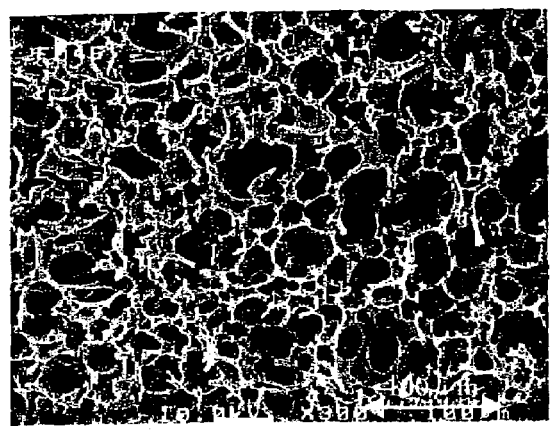
FIG. 3 is an SEM photograph of the organic porous material obtained in Comparative Example 1.
Figure 4:
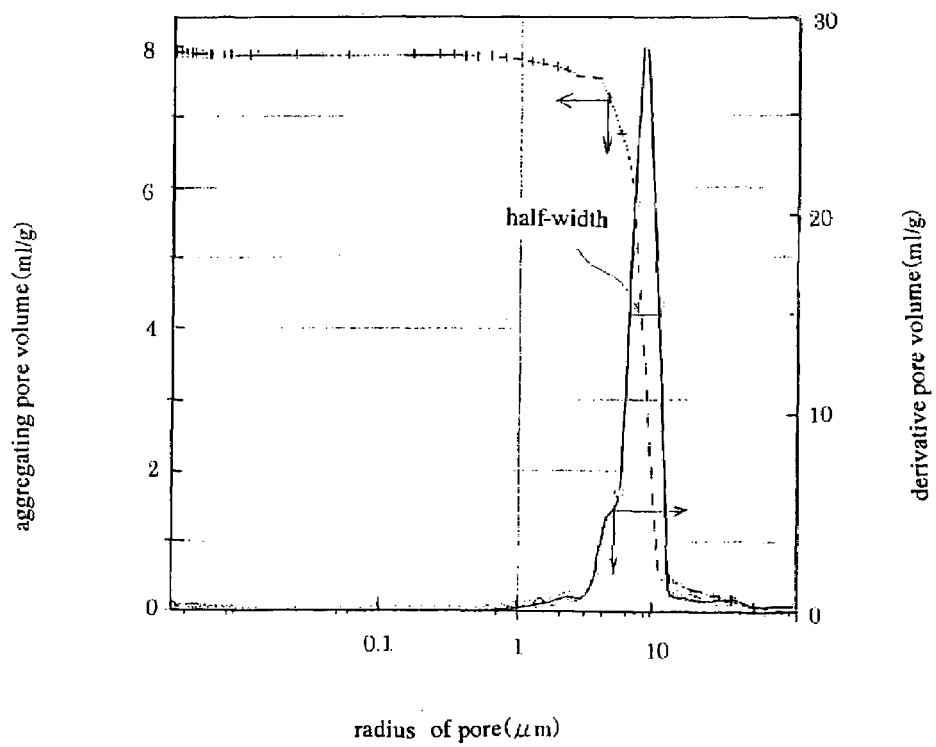
FIG. 4 is a pore distribution curve of the organic porous material obtained in Comparative Example 1.

The results of inspection of the inner structure of the organic porous material by SEM are shown in FIG. 3. Significant fluctuation in size was seen in both macropores and mesopores as compared with the products prepared in the Examples. The pore distribution curve of the organic porous material measured by the mercury porosimetry method is shown in FIG. 4. The peak had a shoulder. The radius (R) of the peak of the pore distribution curve was 7.7 µm, the half-width (W) of the peak was 4.0 µm, and the value (W/R) obtained by dividing the half-width by the radius of the peak was 0.52, which was larger than in the Examples. The mesopores distribution was broader than that of the Examples.

There were many macrovoids observed inside of the organic porous material. Compression strength was measured in the same manner as in Example 1 to find that the yield stress (0.71 Mpa) was low in comparison with the yield stress of the organic porous materials prepared in the Examples. In addition, cracks were produced during the test and the sample was fractured before completion of the test. In addition, in the swelling/shrinkage test carried out in the same manner as in Example 1 cracks were produced during swelling in the second swelling/shrinkage cycle.

Comparative Example 2

(Preparation of Organic Porous Material)

An organic porous material was prepared in the same manner as in Comparative Example 1, except that the stirring conditions at a rate of 20,000 rpm for 2 minutes were changed to 13,000 rpm for 2 minutes. The results are shown in Tables 1 and 2. There were many macrovoids inside the organic porous material. The value (W/R) obtained by dividing the half-width by the radius of the peak was 0.67, which was larger than in the Examples. The mesopores distribution was broader than that of the Examples. Compression strength was measured in the same manner as in Examples 1 to find that the yield stress was low in comparison with the yield stress of the organic porous materials prepared in the Examples. In addition, in the swelling/shrinkage test carried out in the same manner as in Example 1 cracks were appeared during swelling in the first swelling/shrinkage cycle.

TABLE 1

|  | Example | | | | Comparative Example | |
|---|---|---|---|---|---|---|
|  | 1 | 2 | 3 | 4 | 1 | 2 |
| Styrene (g) | 19.24 | 30.46 | 16.20 | 13.16 | 48.10 | 48.10 |
| Divinylbenzene (g) | 1.01 | 1.60 | 4.05 | 7.09 | 2.53 | 2.53 |
| Sorbitan monooleate (g) | 2.25 | 1.71 | 2.25 | 2.25 | 5.63 | 5.63 |
| Azobisisobutylonitrile (g) | 0.05 | 0.08 | 0.08 | 0.10 | 0.12 | 0.12 |
| Water (ml) | 180 | 180 | 180 | 180 | 450 | 450 |

TABLE 2

|  | Example | | | | Comparative Example | |
|---|---|---|---|---|---|---|
|  | 1 | 2 | 3 | 4 | 1 | 2 |
| R (μm) | 6.6 | 5.8 | 6.0 | 6.5 | 7.7 | 8.3 |
| W (μm) | 2.8 | 2.3 | 2.4 | 3.1 | 4.0 | 5.6 |
| W/R | 0.42 | 0.40 | 0.40 | 0.48 | 0.52 | 0.67 |
| Total pore volume (ml/g) | 8.4 | 4.5 | 7.4 | 7.2 | 7.9 | 8.1 |
| Yield stress (Mpa) | 0.92 | 0.95 | 1.04 | 0.97 | 0.71 | 0.69 |
| Cracks | None | None | None | None | Cracked | Cracked |

Example 5

(Preparation of Organic Porous Ion Exchanger)

The organic porous material prepared in Example 1 was cut into pieces. Dichloroethane (800 ml) was added to the pieces (5.9 g) and the mixture was heated at 60° C. for 30 minutes. After cooling to room temperature, chlorosulfuric acid (30.1 g) was slowly added and the mixture was reacted at room temperature for 24 hours. After the reaction, acetic acid was added and the mixture was poured into a large amount of water. A porous cation exchanger was obtained by washing the product with water. The ion exchange capacity of the resulting organic porous ion exchanger was 4.8 mg equivalent/g of dry organic porous material. The wet organic porous ion exchanger was dried for 24 hours at 85° C. under reduced pressure to make it completely dry. No cracks were appeared during drying.

The inner structure of the organic porous ion exchanger contained continuous a pore structure. As a result of measurement by the mercury porosimetry method using the complete dry sample, the radius (R) of the peak of the pore distribution curve was 6.7 μm, the half-width (W) of the peak was 2.7 μm, and the value (W/R) obtained by dividing the half-width by the radius of the peak was 0.40. The total pore volume was 8.5 ml/g.

Comparative Example 3

(Preparation of Organic Porous Ion Exchanger)

An organic porous ion exchanger was produced in the same manner as in Example 5, except that instead of the organic porous material (5.9 g) prepared in Example 1 and cut into pieces, the organic porous material (10.8 g) prepared in Comparative Example 1 was cut into pieces, and instead of chlorosulfuric acid (30.1 g) chlorosulfuric acid (52.9 g) was added. Small cracks were produced due to swelling of the porous material during the production process, but the reaction was continued. The ion exchange capacity of the resulting organic porous ion exchanger was 4.4 μg equivalent/g of dry organic porous material. During the drying operation, the wet organic porous ion exchanger produced new cracks and collapsed.

Example 6

(Performance Evaluation of Organic Porous Ion Exchanger Obtained in Example 5)

Figure 5:
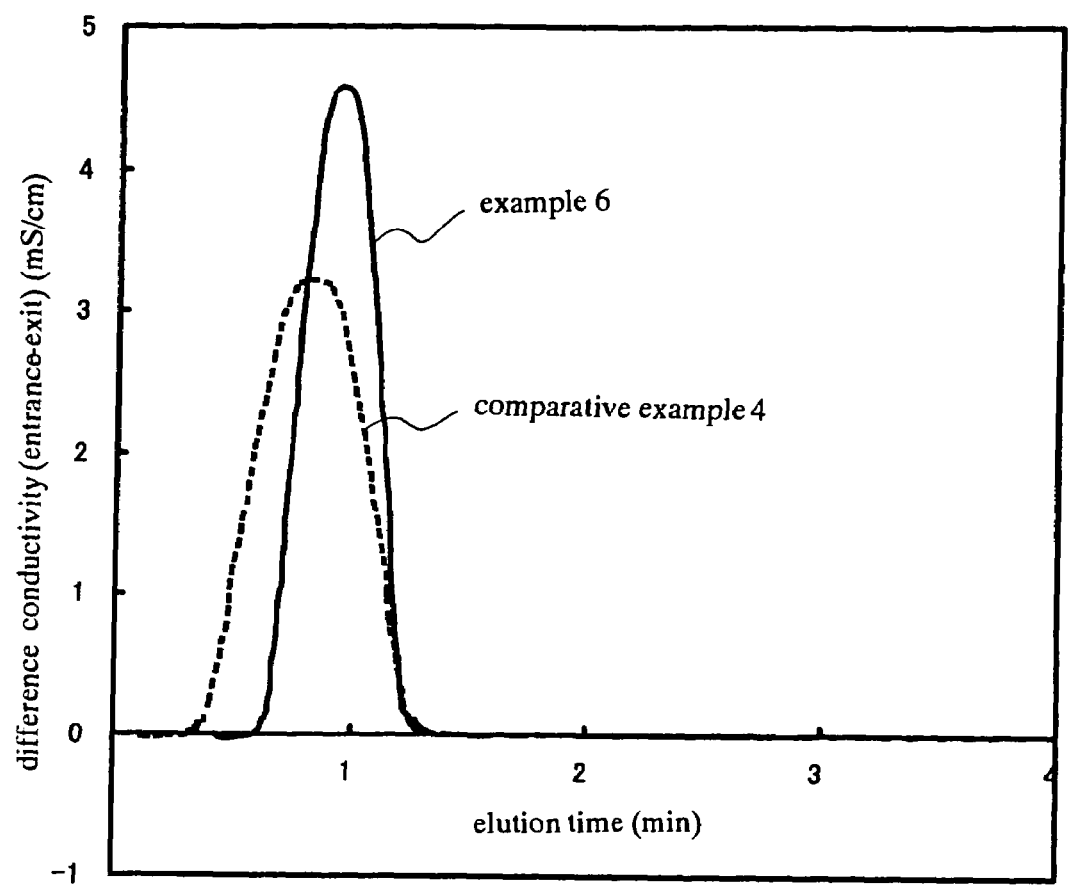
FIG. 5 shows elution curves of ion chromatography obtained in Example 6 and Comparative Example 4.

The ion exchanger obtained in Example 5 was filled in a column with an internal diameter of 7 mm and a length of 90 mm. A 0.2 M HCl aqueous solution was passed through the column for 30 minutes at a flow rate of 24 ml/min to convert counter ions in the ion-exchange groups into hydrogen ions. Then, 1 ml of a 0.2 M sodium chloride aqueous solution was passed through at the same flow rate to convert the hydrogen ions into sodium ions. Subsequently, the 0.2 M HCl aqueous solution was passed through at the same flow rate to desorb the adsorbed sodium ions, during which the conductivity was measured at the column entrance and exit to determine the difference conductivity (entrance-exit). An elution curve was prepared starting from the time (0) at which 0.2 M sodium chloride aqueous solution began to pass through the column. The results are shown in FIG. 5.

Comparative Example 4

(Performance Evaluation of Organic Porous Ion Exchanger Obtained in Comparative Example 3)

An elution curve was prepared in the same manner as in Example 6, except for using the organic porous ion exchanger obtained in Comparative Example 3 instead of the ion exchanger obtained in Example 5. The results are shown in FIG. 5.

As shown in FIG. 5, the curve for the ion exchanger of Example 5 is clearly sharper than the curve of the ion exchanger of Comparative Example 3, confirming superior ion adsorption-desorption characteristics of the organic porous ion exchanger of the present invention.

Example 7

(Preparation of Organic Porous Material)

An organic porous material was prepared in the same manner as in Example 1, except that p-chloromethyl styrene (16.20 g), divinylbenzene (4.05 g), and azobisisobutylonitrile (0.26 g) were used instead of styrene (19.24 g), divinylbenzene (1.01 g), and azobisisobutylonitrile (0.05 g) and the stirring time was changed to 5 minutes.

As a result, the mesopore distribution curve was as sharp as the product of the Example 1. The radius (R) of a peak was 4.5 μm, the half-width (W) of the peak was 2.0 μm, and the value (W/R) obtained by dividing the half-width by the radius of the peak was 0.44. The total pore volume of the organic porous material was 7.0 ml/g. To confirm the presence or absence of macrovoids, the organic porous material was cut and the inner conditions were observed by the naked eye. There were no macrovoids observed at all. In addition, no cracks were found in the swelling/shrinkage test carried out in the same manner as in Example 1.

Example 8

(Preparation of Organic Porous Ion Exchanger)

The organic porous material prepared in Example 7 was cut into pieces. Dioxane (800 ml) was added to the pieces (6.0 g) and the mixture was heated at 60° C. for 30 minutes. After cooling to room temperature, 30% aqueous solution of trimethylamine (61.0 g) was added, and the mixture was reacted at 40° C. for 24 hours. After the reaction, the reaction mixture was poured into a large amount of water. A porous anion exchanger was obtained by washing the product with water. The ion exchange capacity of the resulting organic porous ion exchanger was 2.9 mg equivalent/g of dry organic porous material. The wet organic porous ion exchanger was dried for 72 hours at 60° C. under reduced pressure to make it completely dry. No cracks appeared during drying.

The inner structure of the organic porous ion exchanger contained continuous pores. As a result of measurement by the mercury porosimetry method using the complete dry sample, the radius (R) of the peak of the pore distribution curve was 4.6 µm, the half-width (W) of the peak was 2.0 µm, and the value (W/R) obtained by dividing the half-width by the radius of the peak was 0.43. The total pore volume was 7.0 ml/g.

Example 9

(Performance Evaluation of Organic Porous Ion Exchanger Obtained in Example 8)

The ion exchanger obtained in Example 8 was filled in a column with an internal diameter of 7 mm and a length of 90 mm. A 0.1 M sodium hydroxide aqueous solution was passed through the column for 30 minutes at a flow rate of 24 ml/min to convert counter ions in the ion exchange groups into hydroxide ions. Then, 1 ml of a 0.1 M sodium chloride aqueous solution was passed through at the same flow rate to adsorb Cl ions. Subsequently, the 0.1 M sodium hydroxide aqueous solution was again passed through at the same flow rate to desorb the adsorbed Cl ions, during which the conductivity was measured at the column entrance and exit to determine the difference conductivity (entrance-exit). An elution curve was prepared starting from the time (0) at which 0.1 M sodium chloride aqueous solution began to pass through the column. The results are shown in FIG. 6.

Figure 6:
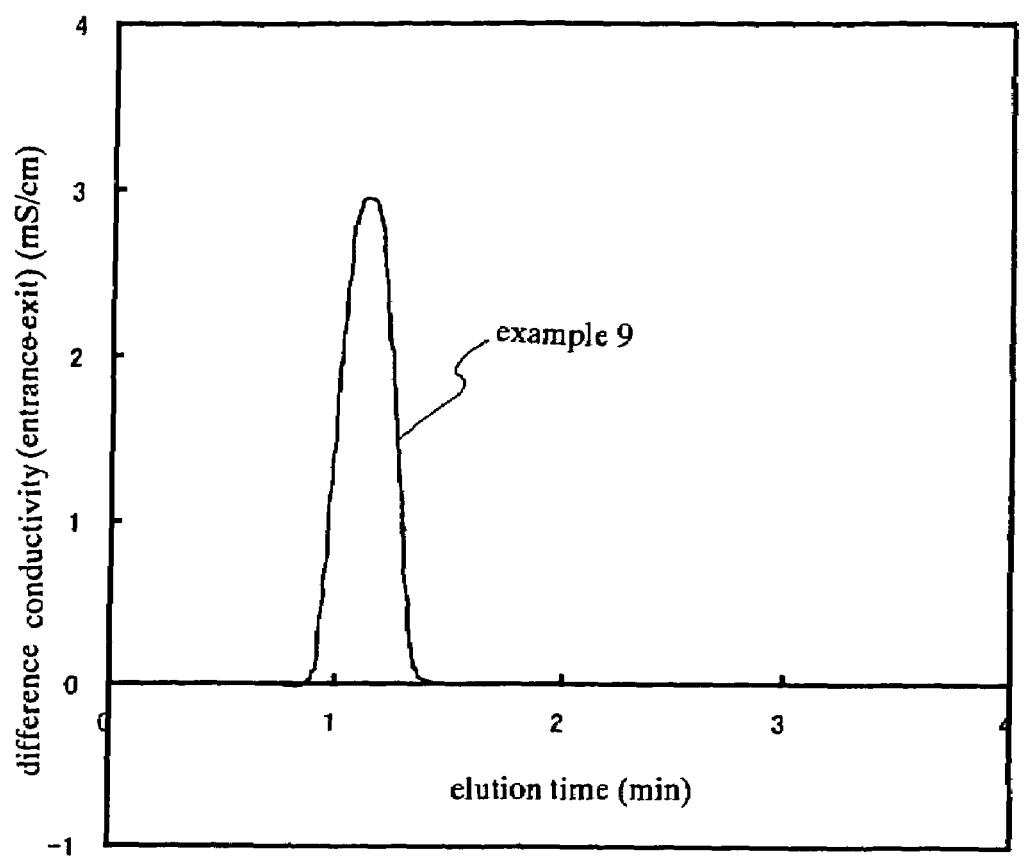
FIG. 6 shows an elution curve of ion chromatography obtained in Example 9.

As shown in FIG. 6, a sharp chloride ion elution curve was obtained in Example 9, confirming superior ion adsorption-desorption characteristics of the organic porous ion exchanger of the present invention.

Example 10

(Preparation of Organic Porous Material)

An organic porous material was prepared in the same manner as in Example 1, except that styrene (15.19 g), divinylbenzene (4.05 g), glycidyl methacrylate (1.01 g), and azobisisobutylonitrile (0.26 g) were used instead of styrene (19.24 g), divinylbenzene (1.01 g), and azobisisobutylonitrile (0.05 g). As a result, the mesopore distribution curve was as sharp as the product of the Example 1. The radius (R) of a peak was 6.3 µm, the half-width (W) of the peak was 2.8 µm, and the value (W/R) obtained by dividing the half-width by the radius of the peak was 0.44. The total pore volume of the organic porous material was 8.2 ml/g. To confirm the presence or absence of macrovoids, the organic porous material was cut and the inner conditions were observed by the naked eye. There were no macrovoids observed at all. In addition, no cracks were found in the swelling/shrinkage test carried out in the same manner as in Example 1.

Example 11

(Preparation of Organic Porous Ion Exchanger)

The organic porous material prepared in Example 10 was cut into pieces. Isopropanol (200 ml) was added to the pieces (7.1 g) and the mixture was stirred for 30 minutes. After the addition of a solution of sodium sulfite (90 g) in purified water (800 ml), the mixture was reacted at room temperature for 24 hours. After the reaction, the reaction mixture was poured into a large amount of water. A porous cation exchanger was obtained by washing the product with water. The ion exchange capacity of the resulting organic porous ion exchanger was 43 µg equivalent/g of the dry organic porous material. The wet organic porous ion exchanger was dried for 72 hours at 60° C. under reduced pressure to make it completely dry. No cracks were found during drying.

The inner structure of the organic porous ion exchanger contained continuous pores. As a result of measurement by the mercury porosimetry method using the complete dry sample, the radius (R) of the peak of the pore distribution curve was 6.2 µm, the half-width (W) of the peak was 2.6 µm, and the value (W/R) obtained by dividing the half-width by the radius of the peak was 0.42. The total pore volume was 8.0 ml/g.

The organic porous material and organic porous ion exchanger of the present invention have a sharp pore distribution, high physical strength, and excellent durability against swelling and shrinkage, and allow gases and liquids uniformly permeate therethrough. Therefore, the organic porous material and ion exchanger are useful and can be applied to a wide variety of fields as a filter, adsorbent, substitute for existing ion exchanger, EDI packing material, filler for ion exchange chromatography, reversed-phase liquid chromatography, and normal phase liquid chromatography, partition chromatography, affinity chromatography, and the like, and solid acid/base catalyst. The process for manufacturing the organic porous material can manufacture the above organic porous material in a simple and secure manner.

What is claimed is:

1. A process of manufacturing an organic porous material, the process comprising charging materials to be processed, which comprise an oil-soluble monomer not containing an ion exchange group, a surfactant, and water, into a mixing vessel, holding the mixing vessel inclined and causing it to move completely around a revolution axis while self-rotating, thereby preparing a water-in-oil type emulsion, polymerizing the monomer, removing unreacted materials, and drying the resulting product, wherein the organic porous material has a continuous pore structure, which comprises interconnected macropores and mesopores with a radius of 0.01 to 100 µm existing on the walls of the macropores, has a total pore volume of 5 to 50 ml/g and has pore distribution curve characteristics wherein the value obtained by dividing the half-width of the pore distribution curve at the main peak by the radius at the main peak is 0.5 or less.

2. The process according to claim 1, wherein the water-in-oil type emulsion is prepared by agitating and mixing the materials to be processed using the planet-type agitator, while holding the mixing container inclined and causing it to move around a revolution axis while self-rotating.

3. The process according to claim 1, wherein the mesopores have a radius of 0.1 to 100 µm.

4. The process according to claim 1, wherein the mesopores have a radius of 5 to 60 µm.

5. The process according to claim 1, wherein the organic porous material has a water permeation rate and an air permeation rate respectively of 100 to 100,000 L/min·m²·Mpa and 100 to 50,000 m³/min·m²·Mpa per thickness of 10 mm.

6. The process according to claim 1, wherein the material of the matrix forming the continuous pore structure is a styrene-divinylbenzene copolymer or a vinyl benzyl chloride-divinylbenzene copolymer.

* * * * *